US008219937B2

(12) United States Patent
Coddington (10) Patent No.: US 8,219,937 B2
(45) Date of Patent: Jul. 10, 2012

(54) MANIPULATION OF GRAPHICAL ELEMENTS ON GRAPHICAL USER INTERFACE VIA MULTI-TOUCH GESTURES

(75) Inventor: Nicole Coddington, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 752 days.

(21) Appl. No.: 12/368,118

(22) Filed: Feb. 9, 2009

(65) Prior Publication Data

US 2010/0201634 A1 Aug. 12, 2010

(51) Int. Cl.
 G06F 3/033 (2006.01)
 G06F 3/041 (2006.01)
(52) U.S. Cl. .................................. 715/863; 345/173
(58) Field of Classification Search .................. 715/863; 345/173
 See application file for complete search history.

(56) References Cited

U.S. PATENT DOCUMENTS

| | | | |
|---|---|---|---|
| 6,996,800 B2 | 2/2006 | Lucassen et al. | |
| 7,409,633 B2 | 8/2008 | Lerner et al. | |
| 7,418,137 B2 | 8/2008 | Lui et al. | |
| 2006/0117067 A1 | 6/2006 | Wright et al. | |
| 2006/0250358 A1 | 11/2006 | Wroblewski | |
| 2007/0047821 A1* | 3/2007 | Nonaka et al. | 382/224 |
| 2007/0061745 A1 | 3/2007 | Anthony et al. | |
| 2008/0010585 A1 | 1/2008 | Schneider et al. | |
| 2008/0250339 A1 | 10/2008 | Riggs et al. | |
| 2009/0278806 A1* | 11/2009 | Duarte et al. | 345/173 |
| 2010/0083111 A1* | 4/2010 | de los Reyes | 715/702 |

OTHER PUBLICATIONS

Moran, et al. "Spatial Interpretation of Domain Objects Integrated into a Freeform Electronic Whiteboard", Retrieved at<<http://www.fxpal.com/people/chiu/paper-mvc-UIST98.pdf>>, Proceedings of UIST'98, pp. 1-10.
Deller, et al."Managing a Document-based Information Space", Retrieved at<<http://www.cipic.ucdavis.edu/~hamann/DellerAgne EbertHagenBernardinHamannEtAl_ IUI2008ConferencePaperFinal12032007.pdf>>, IUI'08, Jan. 13-16, 2008, Maspalomas, Gran Canaria, Spain, pp. 10.
"Launch of Microsoft Surface ", Retrieved at<<http://blogs.msdn.com/emre/archive/2007/06/04/launch-of-microsoft-surface.aspx>>, Dec. 2, 2008, pp. 3.

* cited by examiner

Primary Examiner — Boris Pesin
Assistant Examiner — Rinna Yi
(74) Attorney, Agent, or Firm — Alleman Hall McCoy Russell & Tuttle LLP (57) ABSTRACT

Embodiments related to the manipulation of objects on a multi-touch graphical user interface are disclosed. For example, in one disclosed embodiment, a method of operating a graphical user interface of a computing device comprises presenting a group of objects on the graphical user interface in a group representation, where the group of objects includes two or more objects. The method further comprises receiving a multi-touch gesture at the graphical user interface in which two or more temporally overlapping touches are moved relative to each other on the graphical user interface. The method further comprises changing an organization of the group of objects presented on the graphical user interface in response to a changing of a distance between the two or more temporally overlapping touches as they are moved relative to each other on the graphical user interface.

20 Claims, 5 Drawing Sheets

MANIPULATION OF GRAPHICAL ELEMENTS ON GRAPHICAL USER INTERFACE VIA MULTI-TOUCH GESTURES

BACKGROUND

Multi-touch graphical user interfaces (GUI)s are user interfaces for computing devices that are capable of receiving and utilizing multiple temporally overlapping touch inputs from multiple fingers, styluses, and/or other such manipulators. Such graphical user interfaces include a display system configured to display an image to a user, and a multi-touch input mechanism that is configured to detect multiple temporally overlapping touches over the display. Various types of multi-touch input mechanisms are known, including but not limited to capacitive, resistive and optical mechanisms.

The use of a multi-touch graphical user interface may enable the utilization of a broader range of touch-based inputs than a single-touch input device that cannot detect or interpret multiple temporally overlapping touches. However, current graphical user interfaces that are designed for use with a single-touch input, a single mouse input, or the like, may not be configured to utilize the capabilities offered by multi-touch input devices.

SUMMARY

Accordingly, various embodiments related to the manipulation of objects on a multi-touch graphical user interface are disclosed herein. For example, in one disclosed embodiment, a method of operating a graphical user interface of a computing device is disclosed. The method comprises presenting a group of objects on the graphical user interface in a group representation, where the group of objects includes two or more objects. The method further comprises receiving a multi-touch gesture at the graphical user interface in which two or more temporally overlapping touches are moved relative to each other on the graphical user interface. The method further comprises changing an organization of the group of objects presented on the graphical user interface in response to a changing of a distance between the two or more temporally overlapping touches as they are moved relative to each other on the graphical user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Various embodiments are disclosed herein that relate to the operation of a multi-touch graphical user interface. As mentioned above, many touch-sensitive graphical user interfaces for computing devices are designed for single input use scenarios, such as single touch, single cursor, single mouse, etc. While such user interfaces may provide adequate functionality for use in a multi-touch environment, single-touch user interfaces may not take advantage of the additional capabilities offered by the multi-touch use environment that may allow for a richer user experience.

Figure 1:
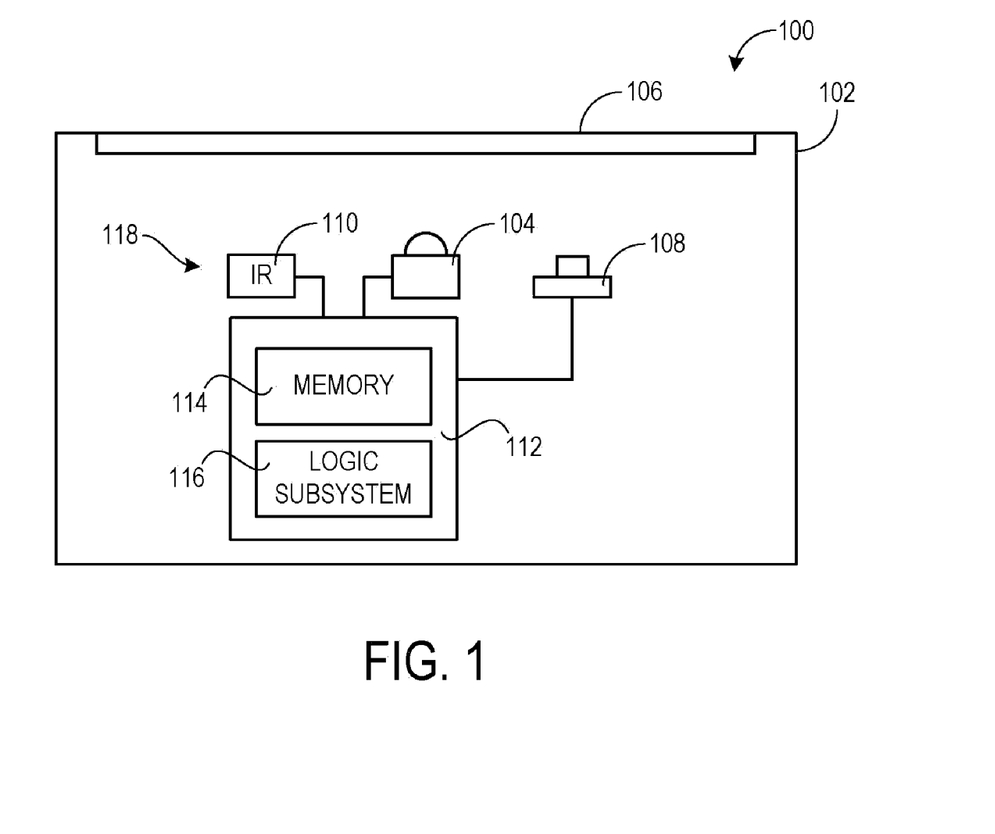
FIG. 1 shows a block diagram of an embodiment of a computing device including an optical touch-sensitive display surface.

Before discussing the graphical user interface-related embodiments disclosed herein, an example multi-touch use environment is described. FIG. 1 shows an embodiment of an example computing device 100 including an optical touch sensitive display surface 102. The optical touch-sensitive display surface 102 comprises an image source 104, such as a projection device, configured to present an image on a display surface 106. Display surface 102 may be configured to present a graphical user interface to a user of the computing device 100.

The optical touch-sensitive display surface 102 also comprises an image sensor 108 for acquiring an infrared image of the display surface 106 to detect objects, such as fingers, touching or contacting the display surface 106. The display surface 106 may comprise various structures such as diffuser layers, anti-glare layers, etc. not shown in detail herein. The optical touch-sensitive display surface 102 further comprises an illuminant 110, depicted herein as an infrared light source, configured to illuminate a backside of the display surface 106 with infrared light.

The image source 104, display surface 106, the image sensor 108, and the illuminant 110 are collectively referred to herein as a multi-touch input device 118. Through operation of one or more of the image source 104, the image sensor 108, and the illuminant 110, the multi-touch input device 118 may be configured to detect multiple temporally overlapping touches on the display surface 106.

For example, infrared light from the illuminant 110 may be reflected by objects on the display surface 106 (e.g., one or more objects touching or contacting the display surface), and then detected by image sensor 108 to allow detection of objects on the display surface 106. An optical filter (not shown) may be used to prevent unwanted wavelengths of light from reaching the image sensor 108. While the depicted embodiment comprises a single image sensor 108, it will be understood that an optical touch-sensitive display surface may have any suitable number of image sensors which each may detect a portion of the display surface 106, or an entire area of the display surface 106.

Computing device 100 further comprises a controller 112 having memory 114 and a logic subsystem 116. Logic subsystem 116 may include one or more processors. Memory 114 may comprise instructions (e.g., one or more programs) executable by the logic subsystem 116 to operate the various components of computing device 100, including the multi-touch input device 118, including image source 104, image sensor 108, and illuminant 110. For example, memory 114 may comprise instructions executable by the logic subsystem 116 to operate the multi-touch input device 118 to present a graphical user interface at or on display surface 106 that enables a user to interact with computing device 100.

The memory 114 may further comprise instructions stored thereon that are executable by the logic subsystem 116 to control the presentation of images on the display surface 106, and to detect and track a plurality of objects that are touching or contacting the display surface 106 via the image sensor 108 and illuminant 110 of the multi-touch input device 118. The various multi-touch inputs described herein may be performed with respect to user interface objects (e.g., graphical objects) that are presented at display surface 106 via a graphical user interface.

Figure 2:
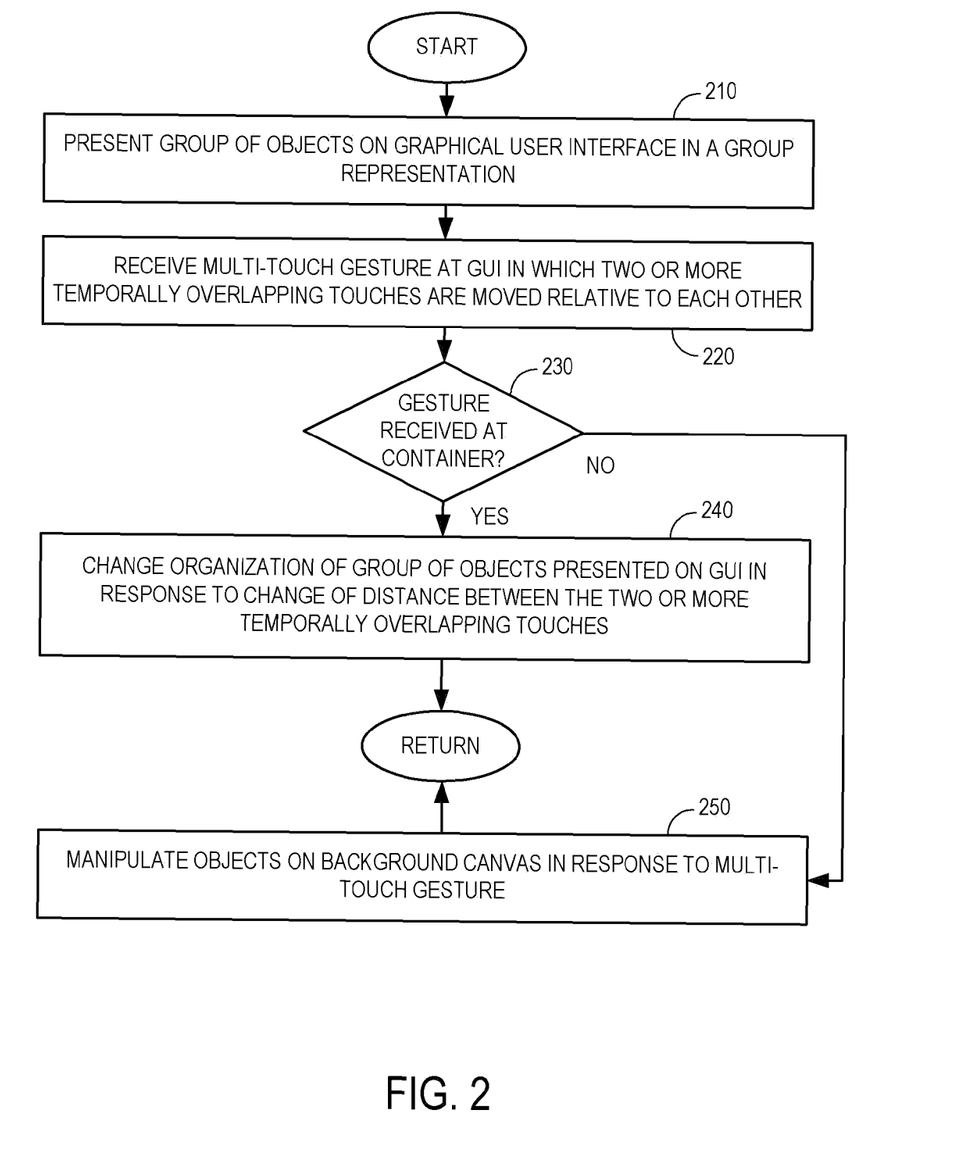
FIG. 2 shows a process flow depicting an embodiment of a method of operating a graphical user interface presented via an optical touch-sensitive display surface according to an embodiment of the present disclosure.

FIG. 2 shows a process flow depicting an embodiment of a method of operating a graphical user interface which may be presented via an optical touch-sensitive display surface according to an embodiment of the present disclosure. The process flow of FIG. 2 will be described in the context of an example graphical user interface shown in FIG. 3, which shows a sequence of user inputs that may be used to change an organization of a group of objects displayed on the graphical user interface according to an embodiment of the present disclosure.

Figure 3:
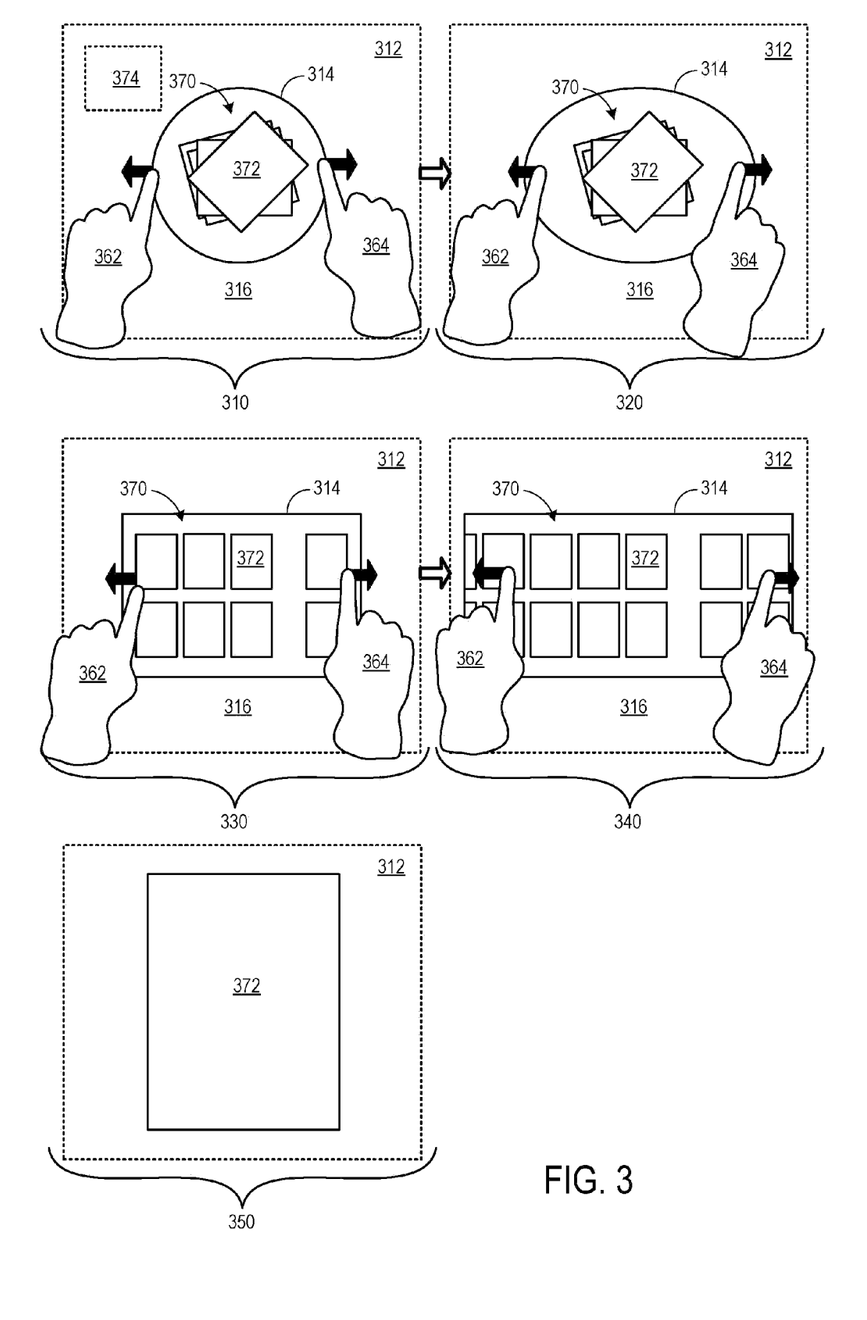
FIG. 3 shows a sequence of inputs that may be used to change an organization of a group of objects displayed on a graphical user interface according to an embodiment of the present disclosure.

At 210, the method includes presenting a group of objects on a graphical user interface in a group representation. For example, controller 112 may be configured to present the graphical user interface via the display surface 106 as previously described with reference to FIG. 1. A non-limiting example of a graphical user interface 312 is shown in FIG. 3 over a sequence of inputs 310, 320, 330, 340, and 350.

In some embodiments, the group of objects may include two or more objects. Examples of such objects include, but are not limited to, icons representing files or applications, thumbnails or full-sized images that represent media content including either still or video images, application windows, interactive objects such as touch input controls (e.g. buttons or the like) in an application window, letters/characters/symbols that may be selected for text input, or any other suitable object and/or combinations thereof. Each object depicted in FIG. 3 is represented as a generic rectangle on the graphical user interface 312; however, it should be appreciated that these generic rectangles represent any suitable type of object that may be displayed on a graphical user interface.

In some embodiments, the group of objects may be presented in a container, and the container may be presented over a background canvas. Referring briefly to FIG. 3, a container 314 is presented over a background canvas 316 in which the container 314 includes a group of objects 370. As a non-limiting example, container 314 may refer to a file container holding group of objects 370.

At 220, the method includes receiving a multi-touch gesture at the graphical user interface in which two or more temporally overlapping touches are moved relative to each other on the graphical user interface. As a first non-limiting example, the two or more temporally overlapping touches may be moved relative to each other on the graphical user interface by a first touch of the two or more temporally overlapping touches being moved on the graphical user interface while a second touch of the two or more temporally overlapping touches is maintained at a substantially fixed location on the graphical user interface. As a second non-limiting example, the two or more temporally overlapping touches may be moved relative to each other on the graphical user interface by a first touch of the two or more temporally overlapping touches being moved on the graphical user interface while a second touch of the two or more temporally overlapping touches is also moved on the graphical user interface relative to the first touch. Referring again to FIG. 3, a first touch of an example multi-touch gesture is depicted at 362 and a second touch of an example multi-touch gesture is depicted at 364.

At 230, the method may include identifying whether the multi-touch gesture was received at or directed at the container. For example, a user may interact with one or more of the container, with the objects contained within the container, or with objects associated with the background canvas. A non-limiting example of a method for identifying whether the multi-touch gesture is received at the container is provided in greater detail with respect to FIG. 4.

As shown at sequence 310 in FIG. 3, a user may direct the multi-touch input at the container by touching an edge of the container and/or an internal region of the container. If the answer at 230 is judged yes, the process flow may proceed to 240. Alternatively, if the answer at 230 is judged no, the process flow may proceed instead to 250. For example, as shown at sequence 310 of FIG. 3, a user may alternatively direct the multi-touch input to an object 374 that is instead associated with the background canvas 316.

At 240, the method includes changing an organization of the group of objects presented on the graphical user interface in response to a changing of a distance between the two or more temporally overlapping touches as they are moved relative to each other on the graphical user interface. A non-limiting example of a method for changing the organization of the group of objects and/or the container shape is provided in greater detail with respect to FIG. 4.

Referring also to FIG. 3, in some embodiments, changing the organization of the group of objects includes changing the group representation from a stacked representation to a tiled representation in response to an increase of the distance between the two or more temporally overlapping touches of the multi-touch gesture. For example, as the distance is increased between touches 362 and 364 over sequences 310, 320, 330, and 340, the group of objects 370 may be changed from a stacked representation (depicted at sequences 310 and 320) to a tiled representation (depicted at sequences 330 and 340).

In some embodiments, the tiled representation is a first tiled representation, such that changing the organization of the group of objects further includes changing the group representation from the first tiled representation to a second tiled representation in response to a further increase of the distance between the two or more temporally overlapping touches of the multi-touch gesture. As shown in FIG. 3, the second tiled representation depicted at sequence 340 may present a greater number of objects than the first tiled representation depicted at sequence 330.

In some embodiments, changing the organization of the group of objects includes expanding the container over the background canvas in response to the increase of the distance between the two or more temporally overlapping touches of the multi-touch gesture. Referring again to FIG. 3, the container may change shape as the distance between touches 362 and 364 increases over sequences 310, 320, 330, and 340. As a non-limiting example, the container may initially have a circular shape as depicted at sequence 310. As the distance between the two or more temporally overlapping touches increase, the shape of the container may change into an ellipse as depicted at sequence 320. As the distance between the two or more temporally overlapping touches increases further, the shape of the container may become rectangular (or other suitable shape) as depicted at sequence 330. Still further increases of the distance between the two or more temporally overlapping touches may cause the rectangular container to increase in size as depicted at sequence 340.

Conversely, in some embodiments, changing the organization of the group of objects includes contracting the container in response to a decrease of the distance between the two or more temporally overlapping touches of the multi-touch gesture. For example, referring again to FIG. 3, sequences 310, 320, 330, and 340 may be reversed by reducing the distance between the two or more temporally overlapping touches to cause the container to contract and/or change shape.

In some embodiments, changing the organization of the group of objects may further include changing the group representation from a tiled representation to a stacked representation in response to a decrease of the distance between the two or more temporally overlapping touches of the multi-touch gesture. For example, referring again to FIG. 3, a user may cause the group of objects to change from the tiled representation (depicted at sequences 330 and 340) to the stacked representation (depicted at sequences 320 and 310) by reducing the distance between the two or more temporally overlapping touches.

In some embodiments, changing the organization of the group of objects includes changing the group representation from a tiled representation to a slide-show representation in response to an increase of the distance between the two or more temporally overlapping touches of the multi-touch gesture. For example, referring again to FIG. 3, the tiled representation depicted at sequence 340 may be changed to a full-screen slide-show representation depicted at sequence 350 by increasing the distance between touches 362 and 364.

Conversely, in some embodiments, changing the organization of the group of objects includes changing the group representation from a slide-show representation to a tiled representation in response to a decrease of the distance between the two or more temporally overlapping touches of the multi-touch gesture. For example, referring again to FIG. 3, a user may change from the slide-show representation of sequence 350 to the tiled representation of sequence 340 by performing a multi-touch gesture in which a distance between two or more temporally overlapping touches is decreased.

If the gesture was not received at or directed to the container at 230, then at 250, the method may include manipulating objects on the background canvas in response to the multi-touch gesture. For example, the multi-touch gesture may be instead used to increase or reduce the size of objects associated with (e.g., presented on) the background canvas. As a non-limiting example, a user may direct the multi-touch gesture to object 374, and may expand or reduce the size of object 374 by changing the relative distance between the two or more temporally overlapping touches accordingly.

Furthermore, it should be appreciated that a single touch gesture may also be used to move objects on the background canvas or to transfer objects between the background canvas and the container. For example, a user may drag and drop an object from the container to the background canvas and vice-versa by touching that object. As a non-limiting example, a user may transfer object 372 from container 314 by touching object 372 with a single touch and moving the single touch onto the background canvas 316. As another example, the user may transfer object 374 from background canvas 316 to container 314 by touching object 374 with a single touch and moving the single touch to the container 314.

Figure 4:
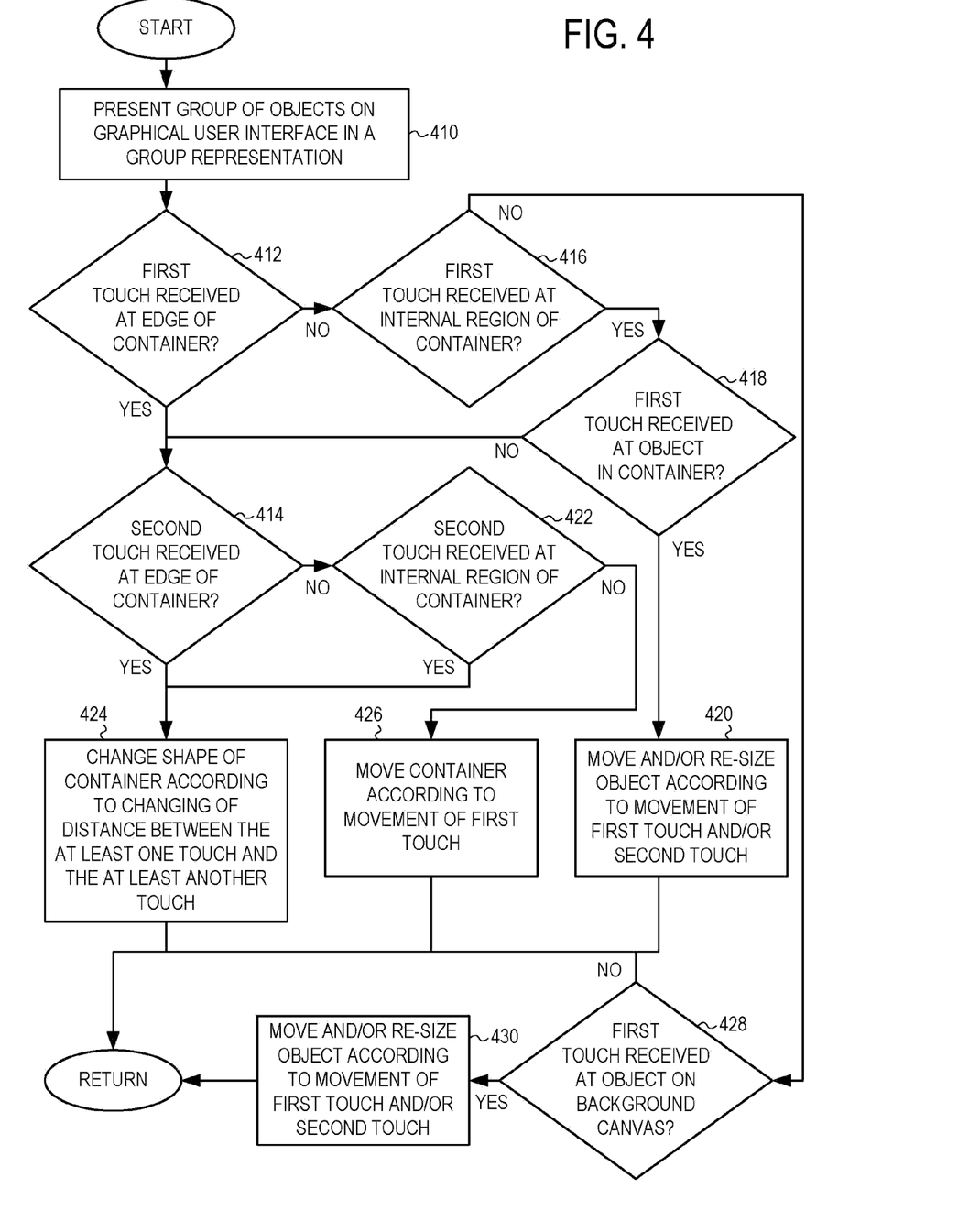
FIG. 4 shows a process flow depicting an embodiment of a method of distinguishing between different multi-touch gestures according to an embodiment of the present disclosure.

FIG. 4 shows a process flow depicting an embodiment of a method of distinguishing between different multi-touch gestures according to an embodiment of the present disclosure. It should be appreciated that the process flow of FIG. 4 may be performed by the computing device of FIG. 1 with the process flow of FIG. 2.

At 410, the method includes presenting a group of objects on the graphical user interface in a group representation. For example, as shown in FIG. 3, the group of objects may be presented in a container. At 412 it may be judged whether a first touch is received at an edge of the container. If the answer at 412 is judged yes, the process flow may proceed to 414. Alternatively, if the answer at 412 is judged no, the process flow may instead proceed to 416.

At 416 it may be judged whether the first touch is instead received at an internal region of the container. If the answer at 416 is judged yes, the process flow may proceed to 418. Alternatively, if the answer at 416 is judged no, the process flow may instead proceed to 428.

At 418 it may be judged whether the first touch is received at an object in the container. If the answer at 418 is judged no, the process flow may proceed to 414. Alternatively, if the answer at 418 is judged yes, the process flow may instead proceed to 420.

At 414 it may be judged whether a second touch of a multi-touch gesture is received at an edge of the container. If the answer at 414 is judged yes, the process flow may proceed to 424. Alternatively, if the answer at 414 is judged no, the process flow may instead proceed to 422. At 422 it may be judged whether the second touch is received at an internal region of the container. If the answer at 422 is judged yes, the process flow may proceed to 424. Alternatively, if the answer at 422 is judged no, the process flow may instead proceed to 426.

At 424, the method may include changing the shape of the container according to a changing of a distance between the first touch and the second touch as shown, for example, in FIG. 3. A non-limiting example, the method at 424 will be described in greater detail with reference to FIG. 5.

At 426, the method may include moving the container according to movement of the first touch. For example, the first touch may be used to translate the container relative to the background canvas. In some embodiments, the presence of only a single touch at the edge or at an internal region of the container may cause the computing device to translate the container rather than change the shape of the container as described at 424.

At 420, the method may include moving and/or re-sizing the object according to movement of the first touch and/or second touch. For example, one or more touches may be used to translate the object within the container or between the container and the background canvas, or to resize the object within the container. In this way, the computing device may be configured to distinguish between a multi-touch gesture that is directed at the container and a multi-touch gesture that is directed at an object within the container. From 420, 424, and 426, the process flow may return.

At 428 it may be judged whether the first touch was instead received at an object on the background canvas. If the answer at 428 is judged yes, the process flow may proceed to 430. Alternatively, if the answer at 428 is judged no, the process flow may instead return. At 430, the method may include moving and/or re-sizing the object according to movement of the first touch and/or second touch. For example, one or more touches may be used to translate the object relative to the background canvas or between the background canvas and the container, or to resize the object on or over the background canvas. In this way, the computing device may be configured to distinguish between a single or multi-touch gesture that is directed at an object associated with the background canvas rather than the container.

Figure 5:
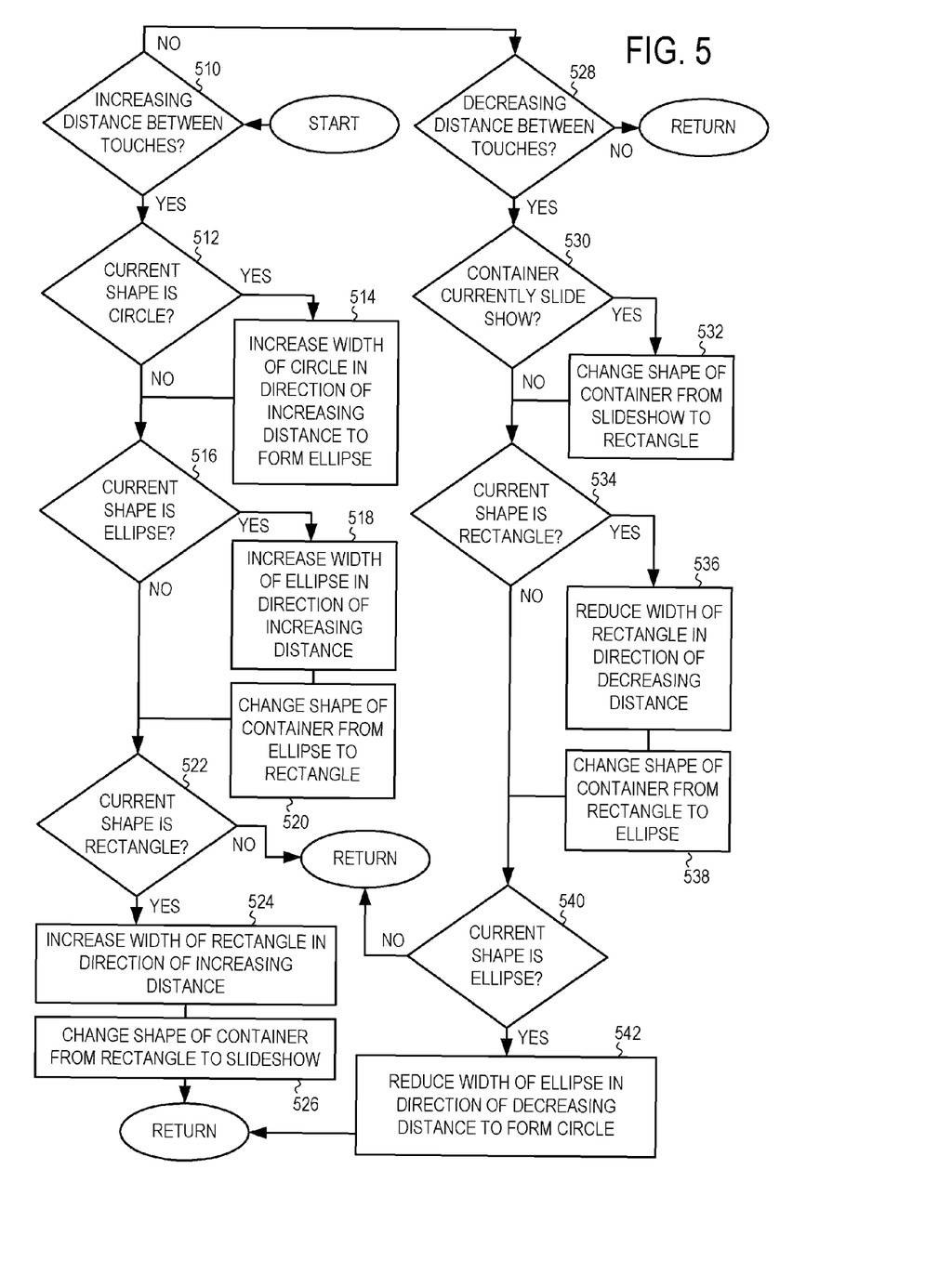
FIG. 5 shows a process flow depicting an embodiment of a method of adjusting a state of a file container according to an embodiment of the present disclosure.

FIG. 5 shows a process flow depicting an embodiment of a method of adjusting a state of a file container according to an embodiment of the present disclosure. Specifically, FIG. 5 provides a non-limiting example of a method for changing a shape of the container according to a changing of a distance between a first touch and a second touch of a multi-touch gesture. It should be appreciated that the process flow of FIG. 5 may be performed by the computing device of FIG. 1 with the process flow of FIGS. 2 and 4.

At 510 it may be judged whether the distance between the first touch and the second touch is increasing. If the answer at 510 is judged yes, the process flow may proceed to 512. Alternatively, if the answer at 510 is judged no, the process flow may instead proceed to 528.

At 512 it may be judged whether the current shape of the container is a circle. For example, the file container may be configured to initially default to a circular shape as shown in FIG. 3 at sequence 310. If the answer at 512 is yes, the process flow may proceed to 514. At 514, the method may include increasing the width of the circle in a direction of the increasing distance between the first touch and the second touch to form an ellipse. A non-limiting example of this process is shown in FIG. 3 by sequences 310 and 320.

At 516 it may be judged whether the current shape of the container is an ellipse. If the answer at 516 is judged yes, the process flow may proceed to 518. At 518, the method may include increasing the width of the ellipse in the direction of the increasing distance between the first touch and the second touch. Alternatively or additionally, at 520, the method may include changing the shape of the container from the ellipse to a rectangle. A non-limiting example of this process is shown in FIG. 3 by sequences 320 and 330. In some embodiments, the method at 520 may further include changing an organization of the group of objects within the container as the container is changed from the ellipse to the rectangle. For example, the group of objects may be changed from a stacked representation to tiled representation as shown in FIG. 3.

At 522 it may be judged whether the current shape is a rectangle. If the answer at 522 is judged no, the process flow may return. Alternatively, if the answer at 522 is judged yes, the process flow may instead proceed to 524. At 524, the method may include increasing the width of the rectangle in the direction of the increasing distance between the first touch and the second touch. A non-limiting example of this process is shown in FIG. 3 by sequences 330 and 340. Alternatively or additionally, at 526, the method may include changing a shape of the container from a rectangle to a slideshow view. A non-limiting example of this process is shown in FIG. 3 by sequences 340 and 350. In some embodiments, the slideshow view may occupy the entire graphical user interface.

Returning to 528, it may be instead judged whether the distance between the first touch and the second touch is decreasing. If the answer at 528 is judged no, the routine may return. Alternatively, if the answer at 528 is judged yes, the process flow may proceed to 530.

At 530, it may be judged whether the container is currently configured as the slideshow view. If the answer at 530 is judged yes, the process flow may proceed to 532. At 532, the method may include changing the shape of the container from the slideshow view to a rectangle. A non-limiting example of this process is shown in FIG. 3 by sequences 350 and 340. Alternatively, if the answer at 530 is judged no, the process flow may instead proceed to 534.

At 534, it may be judged whether the current shape of the container is a rectangle. If the answer at 534 is judged yes, the process flow may proceed to 536. At 536, the method may include reducing the width of the rectangle in the direction of the decreasing distance between the first touch and the second touch. A non-limiting example of this process is shown in FIG. 3 by sequences 340 and 330. Alternatively or additionally, at 538, the method may include changing the shape of the container from the rectangle to an ellipse. A non-limiting example of this process is shown in FIG. 3 by sequences 330 and 320. In some embodiments, the method at 538 may further include changing an organization of the group of objects within the container as the container is changed from the rectangle to the ellipse. For example, the group of objects may be changed from a stacked representation to tiled representation as shown in FIG. 3. Alternatively, if the answer at 534 is judged no, the process flow may proceed to 540.

At 540, it may be judged whether the current shape of the container is an ellipse. If the answer at 540 is judged no, the process flow may return. Alternatively, if the answer at 540 is judged yes, the process flow may proceed to 542. At 542, the method may include reducing the width of the ellipse in the direction of the decreasing distance between the first touch and the second touch to form a circle. A non-limiting example of this process is shown in FIG. 3 by sequences 320 and 310. From 542, the process flow may return.

It will be understood that the methods described herein may be represented by code stored in memory on a computing device, including but not limited to computing device 100 of FIG. 1, and executable by the computing device to perform the disclosed embodiments. While described in the context of an optical touch sensitive device, it will be appreciated that the user interface-related embodiments disclosed herein may be used with any other suitable multi-touch device, including but not limited to capacitive and resistive devices.

Further, it will be understood that the multi-touch input devices disclosed herein may be any suitable type of computing device, including but not limited to console devices, tabletop devices, desktop devices, handheld devices, etc. Such computing devices are configured to execute programs stored in non-volatile memory using portions of volatile memory and a processor and/or other logic subsystem components. As used herein, the term "program" refers to software or firmware components that may be executed by, or utilized by, an optical touch-sensitive computing device, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It will further be understood that the embodiments described herein are exemplary in nature, and that these specific embodiments or examples are not to be considered in a limiting sense, because numerous variations are contemplated. Accordingly, the present disclosure includes all novel and non-obvious combinations and sub-combinations of the various embodiments disclosed herein, as well as any and all equivalents thereof.

The invention claimed is:

1. A method of operating a graphical user interface of a computing device, comprising:
    presenting a group of objects on the graphical user interface in a group representation, the group of objects including two or more objects;

receiving a multi-touch gesture at the graphical user interface in which two or more temporally overlapping touches are moved apart on the graphical user interface; and changing an organization of the group of objects presented on the graphical user interface to a slide-show representation;

receiving a multi-touch gesture at the graphical user interface in which two or more temporally overlapping touches are moved closer together on the graphical user interface; and changing the organization of the group of objects presented on the graphical user interface from the slide-show representation.

2. The method of claim 1, where changing the organization of the group of objects to the slide-show representation includes changing the group representation from a tiled representation to the slide-show representation.

3. The method of claim 2,
where changing the organization of the group of objects from the slide-show representation comprises changing to the tiled representation.

4. The method of claim 2, where presenting a group of objects on the graphical user interface in the group representation further comprises presenting the group of objects in a container, the container presented on the graphical user interface over a background canvas; and
where changing the organization of the group of objects includes:
expanding the container over the background canvas in response to an increase of a distance between the two or more temporally overlapping touches of the multi-touch gesture; and
contracting the container in response to a decrease of a distance between the two or more temporally overlapping touches of the multi-touch gesture.

5. The method of claim 1, where the slide-show representation is a first representation, wherein changing the organization from the slide-show representation comprises changing the organization from the slide-show representation to a second representation, and further comprising changing the organization from the second representation to a third representation in response to an additional decrease of the distance between the two or more temporally overlapping touches of the multi-touch gesture.

6. The method of claim 5, where the second representation is a first tiled representation and the third representation is a second tiled representation, and where the first tiled representation presents a greater number of objects than the second tiled representation.

7. The method of claim 5, where the second representation is a first tiled representation and the third representation is a stacked representation.

8. The method of claim 1, where the two or more temporally overlapping touches are moved relative to each other on the graphical user interface by a first touch of the two or more temporally overlapping touches being moved on the graphical user interface while a second touch of the two or more temporally overlapping touches is maintained at a substantially fixed location on the graphical user interface.

9. The method of claim 1, where the two or more temporally overlapping touches are moved relative to each other on the graphical user interface by a first touch of the two or more temporally overlapping touches being moved on the graphical user interface while a second touch of the two or more temporally overlapping touches is also moved on the graphical user interface relative to the first touch.

10. A computing device, comprising:
a display surface configured to present a graphical user interface;
a multi-touch input device configured to detect multiple temporally overlapping touches on the display surface;
a logic subsystem comprising a processor; and
memory comprising instructions stored thereon that are executable by the logic subsystem to operate the display surface and the multi-touch input device to:
present a group of objects on the graphical user interface in a group representation via the display surface, the group of objects including two or more objects;
receive a multi-touch gesture at the graphical user interface via the multi-touch input device in which two or more temporally overlapping touches are moved apart on the graphical user interface;
change an organization of the group of objects presented on the graphical user interface to a slide-show representation;
receive a multi-touch gesture at the graphical user interface via the multi-touch input device in which two or more temporally overlapping touches are moved closer together on the graphical user interface; and
change the organization of the group of objects presented on the graphical user interface from the slide-show representation.

11. The computing device of claim 10, wherein the instructions executable to change the organization to the slide-show representation are further executable to change the organization of the group of objects from a tiled representation to the slide-show representation.

12. The computing device of claim 11,
wherein the instructions executable to change the organization from the slide-show representation are further executable to change the organization of the group of objects from the slide-show representation to the tiled representation.

13. The computing device of claim 11, wherein the instructions are further executable to:
present the group of objects in a container; and
present the container on the graphical user interface over a background canvas; and
expand the container over the background canvas in response to an increase of a distance between the two or more temporally overlapping touches of the multi-touch gesture; and
contract the container in response to a decrease of a distance between the two or more temporally overlapping touches of the multi-touch gesture.

14. The computing device of claim 10, wherein the slide-show representation is a first representation, wherein changing the organization from the slide-show representation comprises changing the organization of the group of objects from the slide-show representation to a second representation, and further comprises changing the organization of the group of objects from the second representation to a third representation in response to an additional decrease of a distance between the two or more temporally overlapping touches of the multi-touch gesture.

15. The computing device of claim 14, wherein the second representation is a first tiled representation and the third representation is a second tiled representation, wherein the first tiled representation presents a greater number of objects than the second tiled representation.

16. The computing device of claim 14, wherein the second representation is a first tiled representation and the third representation is a stacked representation.

17. The computing device of claim 10, wherein the multi-touch input device is configured to detect that the two or more temporally overlapping touches are moved relative to each other on the graphical user interface if a first touch of the two or more temporally overlapping touches is moved on the graphical user interface while a second touch of the two or more temporally overlapping touches is maintained at a substantially fixed location on the graphical user interface.

18. The computing device of claim 10, wherein the multi-touch input device is configured to detect that two or more temporally overlapping touches are moved relative to each other on the graphical user interface if a first touch of the two or more temporally overlapping touches is moved on the graphical user interface while a second touch of the two or more temporally overlapping touches is also moved on the graphical user interface relative to the first touch.

19. On a computing device including a display surface configured to present a graphical user interface and a multi-touch input device configured to detect multiple temporally overlapping touches on the display surface, a method comprising:

presenting a group of objects on the graphical user interface in a group representation via the display surface, the group of objects including two or more objects presented within a container;

receiving a multi-touch gesture at the graphical user interface via the multi-touch input device in which two or more temporally overlapping touches are moved apart on the graphical user interface independent of a contextualized menu;

changing an organization of the group of objects presented on the graphical user interface to a slide-show representation;

receiving a multi-touch gesture at the graphical user interface in which two or more temporally overlapping touches are moved closer together on the graphical user interface independent of a contextualized menu; and changing the organization of the group of objects presented on the graphical user interface from the slide-show representation.

20. The method of claim 19, wherein changing the organization of the group of objects to the slide show representation includes changing the group representation from a stacked representation or a tiled representation.

\* \* \* \* \*